United States Patent
Seibert et al.

(12) 
(10) Patent No.: US 10,347,038 B1
(45) Date of Patent: Jul. 9, 2019

(54) DETERMINING VISIBILITY IN VIRTUAL ENVIRONMENTS

(71) Applicant: Amazon Technologies, Inc., Seattle, WA (US)

(72) Inventors: Lucas Darryl Seibert, Los Angeles, CA (US); Rajeev Varma Penmatsa, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 418 days.

(21) Appl. No.: 14/627,793

(22) Filed: Feb. 20, 2015

(51) Int. Cl.
*G06T 15/40* (2011.01)
*G06T 15/06* (2011.01)

(52) U.S. Cl.
CPC .............. *G06T 15/40* (2013.01); *G06T 15/06* (2013.01)

(58) Field of Classification Search
CPC ................................ G06T 15/40; G06T 15/06
See application file for complete search history.

(56) References Cited

U.S. PATENT DOCUMENTS

| | | | |
|---|---|---|---|
| 7,430,257 B1 | 9/2008 | Shattil | |
| 8,392,473 B2 | 3/2013 | Thomson et al. | |
| 9,171,396 B2 | 10/2015 | Jenkins | |
| 9,489,762 B2 | 11/2016 | Jenkins | |
| 2006/0294238 A1 | 12/2006 | Naik et al. | |
| 2007/0112803 A1 | 5/2007 | Pettovello | |
| 2007/0206008 A1 | 9/2007 | Kaufman et al. | |
| 2008/0144529 A1 | 6/2008 | McKee et al. | |
| 2009/0275414 A1* | 11/2009 | Lee | A63F 13/12 463/42 |
| 2010/0122236 A1 | 5/2010 | Bugir et al. | |
| 2011/0113155 A1 | 5/2011 | Kuznetsov et al. | |
| 2012/0229445 A1 | 9/2012 | Jenkins | |
| 2013/0339545 A1 | 12/2013 | Shenoi et al. | |
| 2014/0006342 A1 | 1/2014 | Love et al. | |
| 2014/0200036 A1 | 7/2014 | Egner et al. | |
| 2014/0270480 A1 | 9/2014 | Boardman et al. | |
| 2014/0279662 A1 | 9/2014 | Wang et al. | |
| 2014/0289206 A1 | 9/2014 | Zhang et al. | |
| 2015/0370445 A1 | 12/2015 | Wang et al. | |
| 2016/0134373 A1 | 5/2016 | Gros et al. | |
| 2016/0174106 A1 | 6/2016 | Lee et al. | |
| 2016/0217371 A1 | 7/2016 | Leithiser | |

OTHER PUBLICATIONS

Darken, Christian J. Visibility and concealment algorithms for 3D simulations. Naval Postgraduate School Monterey CA Dept of Computer Science, 2004.*

Adobbati, Rogelio, et al. "Gamebots: A 3d virtual world test-bed for multi-agent research." Proceedings of the second international workshop on Infrastructure for Agents, MAS, and Scalable MAS. vol. 5. Montreal, Canada, 2001.*

(Continued)

*Primary Examiner* — Maurice L. McDowell, Jr.
(74) *Attorney, Agent, or Firm* — Lee & Hayes, P.C.

(57) ABSTRACT

Technologies are disclosed herein for providing a vision-obstruction service for distributed processing of visibility data for a virtual environment. The vision-obstruction service is configured to initiate processing unit instances to process ray-trace data, and to determine if visibility exists between a source of a ray-trace and a destination of the ray-trace.

20 Claims, 9 Drawing Sheets

(56) References Cited

OTHER PUBLICATIONS

Blewitt, William, Gary Ushaw, and Graham Morgan. "Applicability of gpgpu computing to real-time ai solutions in games." IEEE Transactions on Computational Intelligence and AI in Games 5.3 (2013): 265-275("Blewitt").*

Pursel, Eugene Ray. Synthetic vision visual perception for computer generated forces using the programmable graphics pipeline. Diss. Monterey, California. Naval Postgraduate School, 2004.*

Granatir, Orion. "Two Brains Are Better Than One." Intel Software Development Zone. Jan. 12, 2014. Web. Aug. 7, 2017. <https://software.intel.com/en-us/articles/two-brains-are-better-than-one>. Internet Archive. <https://web.archive.org/web/20140112154937/http://software.intel.com:80/en-us/articles/two-brains-are-better-than-one>.*

Buro, Michael, and Timothy M. Furtak. "RTS games and real-time AI research." Proceedings of the Behavior Representation in Modeling and Simulation Conference (BRIMS). vol. 6370. 2004.*

Eisert, Peter, and Philipp Fechteler. "Remote Rendering of Computer Games." SIGMAP. 2007.*

"A* search algorithm," Wikipedia, available at: http://en.wikipedia.org/wiki/A*_search_algorithm, downloaded Feb. 11, 2015, 11 pages.

Horn et al., "Interactive k-D tree GPU raytracing", In Proceedings of the 2007 Symposium on Interactive 3D Graphics and Games, ACM, May 17, 2007, pp. 167-174. 8 pages.

Office action for U.S. Appl. No. 14/627,789, dated Apr. 20, 2017, Seibert et al., "Distributed Rocessing of Path Solutions", 22 pages.

Office action for U.S. Appl. No. 14/627,903, dated Feb. 16, 2016, Seibert et al., "Hierarchical Processing and Caching of Path Solutions", 10 pages.

Office Action for U.S. Appl. No. 14/627,789, dated Jun. 13, 2018, Seibert, "Distributed Processing Path Solutions", 18 pages.

Office Action for U.S. Appl. No. 14/627,789, dated Oct. 31, 2017, Seibert, "Distributed Processing of Path Solutions", 26 pages.

Office Action dated Jan. 18, 2019 for U.S. Appl. No. 14/627,789 "Distributed Processing of Path Solutions" Seibert, 18 pages.

* cited by examiner

US 10,347,038 B1

DETERMINING VISIBILITY IN VIRTUAL ENVIRONMENTS

BACKGROUND

Many graphical applications, such as video games, three-dimensional (3D) object and video rendering applications, and other similar graphical applications, include complex underlying problems for appropriately determining solutions to geometry-based issues. Geometry-based issues can include visualization issues with regard to how a portion of an object is visualized in light of obstacles or other elements in a virtual space. For example, one particular geometry-based issue in graphical applications is determining the visibility of an object in the virtual space.

Conventionally, geometry-based issues involving the visibility of objects from one or more points of observation are computationally complex. For example, determining whether an object is visible from the vantage point of a character in a video game may involve many different considerations. The considerations can include obstacles that may obstruct visibility, other virtual elements such as additional characters that may obstruct visibility, how many points of observation (e.g., eyes) are directed towards an element, and other similar considerations.

It follows that as the number of elements for which visibility is being determined increases, the computational complexity for accurately and quickly determining visibility also increases. Accordingly, conventional solutions may limit a total number of visibility calculations in order to leverage computations to a feasible level. However, if the number of visibility calculations are limited, immersive experiences that take into consideration real-time visibility for a large portion of a virtual space are difficult to obtain.

The disclosure made herein is presented with respect to these and other considerations.

DETAILED DESCRIPTION

Figure 1:
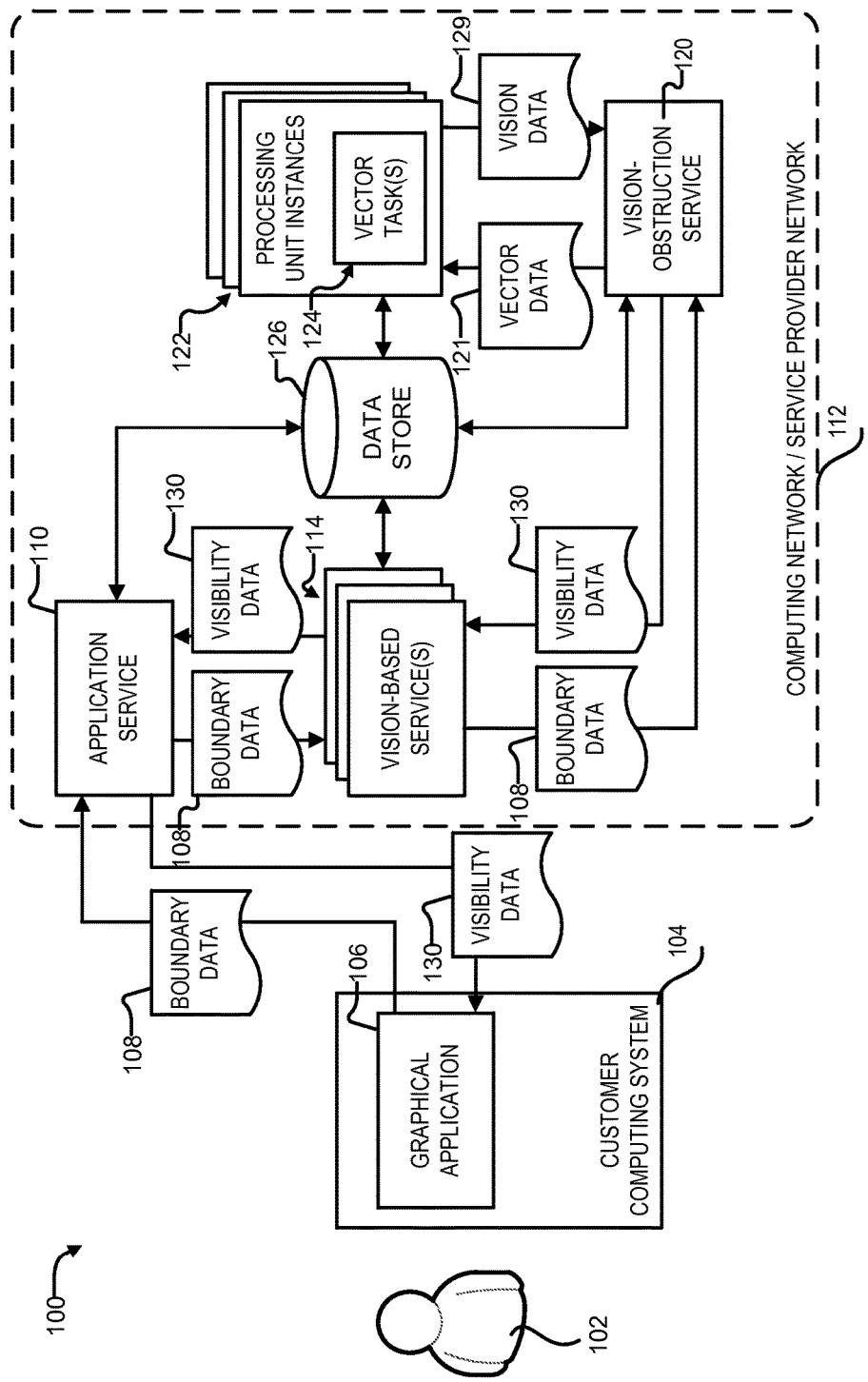
FIG. 1 is a system architecture diagram showing aspects of the configuration and operation of a vision-obstruction service in one configuration presented herein.

The following detailed description is directed to technologies for providing a vision-obstruction service. Utilizing the technologies described herein, a vision-obstruction service can be implemented that distributes visibility calculations for a virtual space or virtual environment across processing unit computing instances, for example graphical processing unit (GPU) computing instances, in a service provider network.

The vision-obstruction service may receive boundary data from one or more vision-based services for processing to determine visibility. The boundary data can include, for example, bound information, vantage points, points of observation, and other information related to the bounds of elements and objects rendered in the virtual space. The bounds can be represented by any conceivable shape, including geometric patterns. Furthermore, the vantage information can include one or more viewpoints or points of observation. The vision-based services include services requesting visibility data representative of the visibility of one or more objects from one or more points of observation in the virtual space.

Upon receiving the boundary data, the vision-obstruction service may generate vector data or raytrace data representing one or more vectors or raytraces between the points of observation and the elements described in the boundary data. The vision-obstruction service may subsequently initialize processing unit instances through vector tasks executing thereon to analyze the vector data in a substantially parallel manner.

The processing unit instances may execute raytrace algorithms to determine whether unobstructed raytraces exist according to the vector data. Generally, raytrace algorithms include algorithms configured to determine if a virtual representation of a ray of light can travel, uninterrupted, between two points in a virtual space. Raytrace algorithms may also include algorithms configured to determine if more complex interaction patterns result in "virtual photons" travelling between the two points. The more complex interactions can include reflections in a virtual mirror or pool of water, consideration of shadows or virtual camouflage, and/or consideration of Doppler-shift and/or speed of travel of a relatively small object. The vector data may describe one or more of these scenarios, or potentially others, and may be taken up for processing by the raytrace algorithms of the initialized processing unit instances.

Upon processing the vector data, the initialized processing unit instances may output vision data representative of a portion of the visibility for the boundary data based on a number of unobstructed raytraces. The vision-obstruction service can assemble the vision data to determine appropriate visibility data to return to the requesting vision-based service.

The vision-obstruction service may be implemented as a back-end network service providing visibility data to any requesting vision-based service, as well as any other network service providing meaningful boundary data for analysis. Additional details regarding the various components and processes described above for implementing a vision-obstruction service will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a vision-obstruction service 120 in one configuration presented herein. As shown in FIG. 1, a customer 102 may operate a customer computing system 104. The customer computing system 104 may include any suitable computing system. For example, the customer computing system 104 can include a portable computer, mobile device, tablet computer, or similar computing devices. According to one implementation, the customer computing system 104 is a mobile computing device having somewhat limited processing capabilities.

The customer computing system 104 is configured to execute a graphical application 106. The graphical application 106 may include a three-dimensional (3D) rendering application, such as an application for visualizing a virtual space. The graphical application 106 may also include a video game. The graphical application can also include other applications that consider one or more geometry-based problems, and in particular, visibility in virtual spaces.

The graphical application 106 may determine boundary data 108 for at least one graphical problem, according to some implementations. The boundary data 108 can include bound information, vantage points, points of observation, and other information related to the bounds of elements and objects rendered in the virtual space. The bounds can be represented by any conceivable shape, including rectangles, circles, arcuate sections, straight sections, or complex geometric patterns. Furthermore, the vantage information can include one or more viewpoints or points of observation. Additionally, the one or more points of observation can include particular details including available virtual light, position of light sources, and other considerations. Representations of boundary data and the virtual space are described more fully with reference to FIGS. 2 and 3.

The boundary data 108 is transmitted from the graphical application 106 to an application service 110, deployed at a service provider network or computing network 112. The application service 110 is configured as a network service that provides data associated with the virtual space and placement of elements within the virtual space to the graphical application 106. According to one implementation, the application service 110 is a server application configured to provide visibility information for characters, enemies, and/or virtual representations of objects in the virtual space. Accordingly, the application service 110 provides information necessary for determining visibility within a graphical interface of the graphical application 106.

The application service 110 may receive the boundary data 108 and transmit the boundary data to a vision-based service 114. Generally, the vision-based service 114 is deployed at the service provider network 112, and requests visibility information related to one or more elements in the virtual space. The vision-based service can include an artificial intelligence service managing the positioning of characters, enemies, and other elements in a video game, according to one configuration. Furthermore, the vision-based service can include a path-finding service requesting visibility data in order to determine a cost or weight associated with traversing a particular portion of the virtual space, in some configurations.

The vision-based service 114 may process the boundary data 108 and update the boundary data 108 according to further information retrievable from a data store 126. For example the vision-based service 114 may access the data store 126 to retrieve mapping information of the virtual space being considered, including positions of obstacles, position of light sources, and other data stored in the mapping information for the virtual space. The data store 126 can include any suitable data storage device. Additionally, although illustrated as a centralized data store, the data store 126 can also include more than one data store, or potentially several data storage devices. Furthermore, the data store 126 may be represented as replicated data. Using the mapping information, the vision-based service 114 may access, update, and store boundary data 108 for elements in the virtual space. Upon updating of the boundary data 108, the vision-based service 114 may transmit the boundary data 108 to the vision-obstruction service 120 that is also deployed at the service provider network 112.

The vision-obstruction service 120 is configured to process the boundary data 108 to create vector data 121 for distributed processing. For example, the vision-obstruction service 120 may determine one or more vectors or raytraces extending between one or more points of observation and the bounds of an obstacle, character, element, or other element in the virtual space. The vector data 121 may be created based on the virtual space being spatially partitioned.

Generally, in examples where the virtual space is spatially partitioned, the spatial partitions include two or more subsets or divisions of virtual space. Accordingly, elements may be divided into the two or more subsets to simply processing. For example, when considering boundary data 108, any point existing in the boundary data 108 can be determined to exist in exactly one subset or division in the virtual space. Thus, the spatially partitioned virtual space comprises disjoint divisions.

The vision-obstruction service 120 may group sets of vector calculations based on single points of observation, for example, such that individual points of observation are considered through a single computing instance. Thus, each point of observation can be considered as existing within a single subset of the virtual space, and therefore the vector calculations can be grouped based on this spatial partitioning.

The vision-obstruction service 120 directs groups of raytraces described in the vector data 121 to processing unit instances 122 having vector tasks 124 executing thereon. The processing unit instances 122 may include GPU instances, according to one implementation. Other forms of processing unit instances are also applicable. The vision-obstruction service 120 initializes a processing unit instance 122 to process each point of observation described in the vector data 121.

The initialized processing unit instances 122 and associated vector tasks 124 calculate associated vision data 129 for the assigned raytraces. The processing unit instances 122 may operate substantially in parallel. Furthermore, as each processing unit instance 122 and an associated vector task 124 calculates vision data 129, the vision data 129 is transmitted to the vision-obstruction service 120 for consideration.

The vision-obstruction service 120 is configured to consider each portion of vision data 129 as it is received. Upon receipt of all vision data 129 associated with the boundary data 108, the vision-obstruction service 120 determines visibility data 130, and transmits visibility data 130 to the vision-based service 114.

The visibility data 130 may include a binary value indicating whether or not an object, element, or other aspect of a virtual space is visible by a point of observation. Additionally, the visibility data 130 may include values indicating whether or not a portion of an object, element, or other aspect of a virtual space is visible by a point of observation. Furthermore, the visibility data 130 can include values indicating whether or not a portion of an object, element, or other aspect of a virtual space is visible by more than one point of observation. In this manner, the visibility data 130 can be used by the requesting vision-based service 114 to provide meaningful information to the graphical application 106 and/or the application service 110.

Figure 2A:
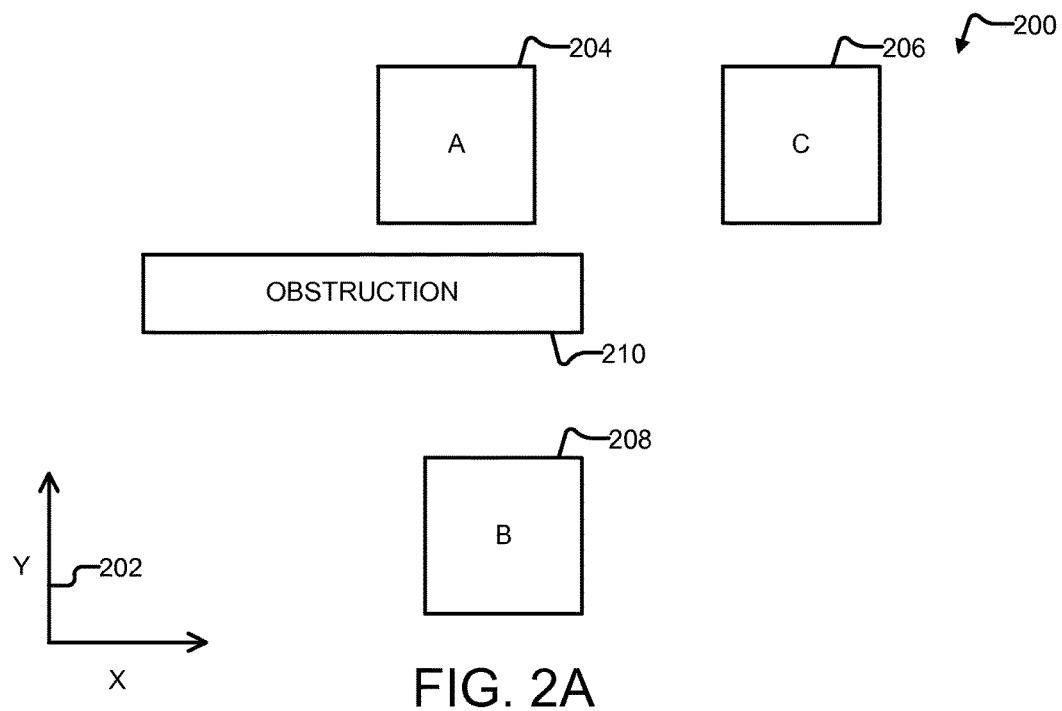
FIG. 2A is a diagram illustrating aspects of a virtual space for processing by a vision-obstruction service in one configuration described herein.

As described briefly above, the virtual space can be represented by boundary data 108. For example, one or more raytraces or vectors can be determined to extend between points of observation and boundaries of objects in the virtual space. Turning to FIG. 2A, a diagram illustrating aspects of a virtual space 200 for processing by a vision-obstruction service in one configuration described herein, is illustrated.

Figure 2B:
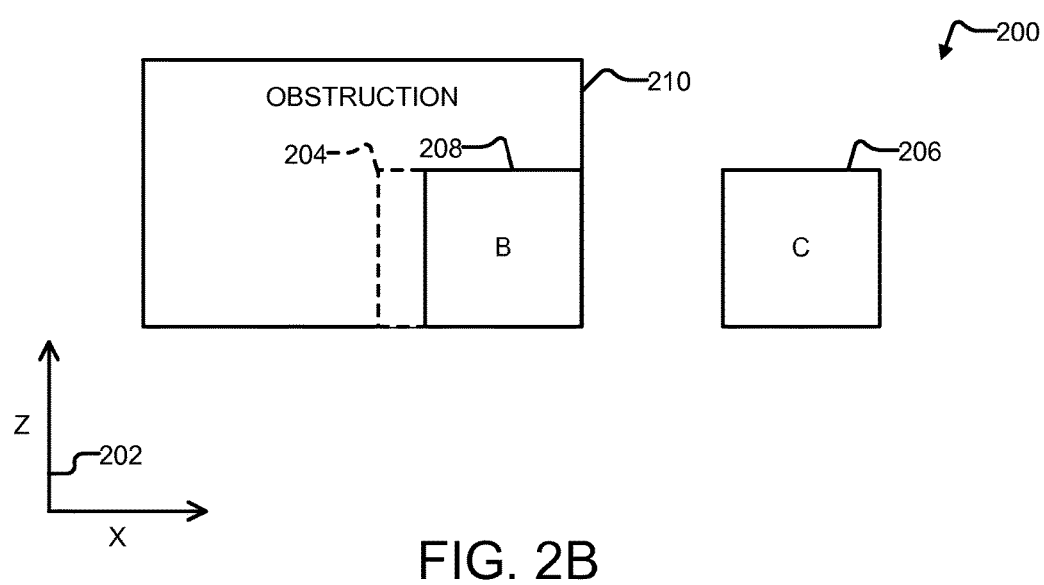
FIG. 2B is a diagram illustrating aspects of a virtual space for processing by a vision-obstruction service in one configuration described herein.

As shown, the virtual space 200 is rendered as a two-dimensional representation having a coordinate axis 202. The virtual space 200 includes four simplified elements rendered therein. The element A, labeled as 204 and the element C, labeled as 206, are separated along the x-axis. Additionally, the elements A and C are separated from the element B, labeled as 208, along the y-axis. Furthermore, an obstruction 210 is also present. As shown, general visibility data may be inferred by placement of the obstruction 210 relative to the elements A, B, and C. However, as shown in FIG. 2B, an entire determination as to visibility is difficult considering the separation of elements B and C along the z-axis.

Figure 3A:
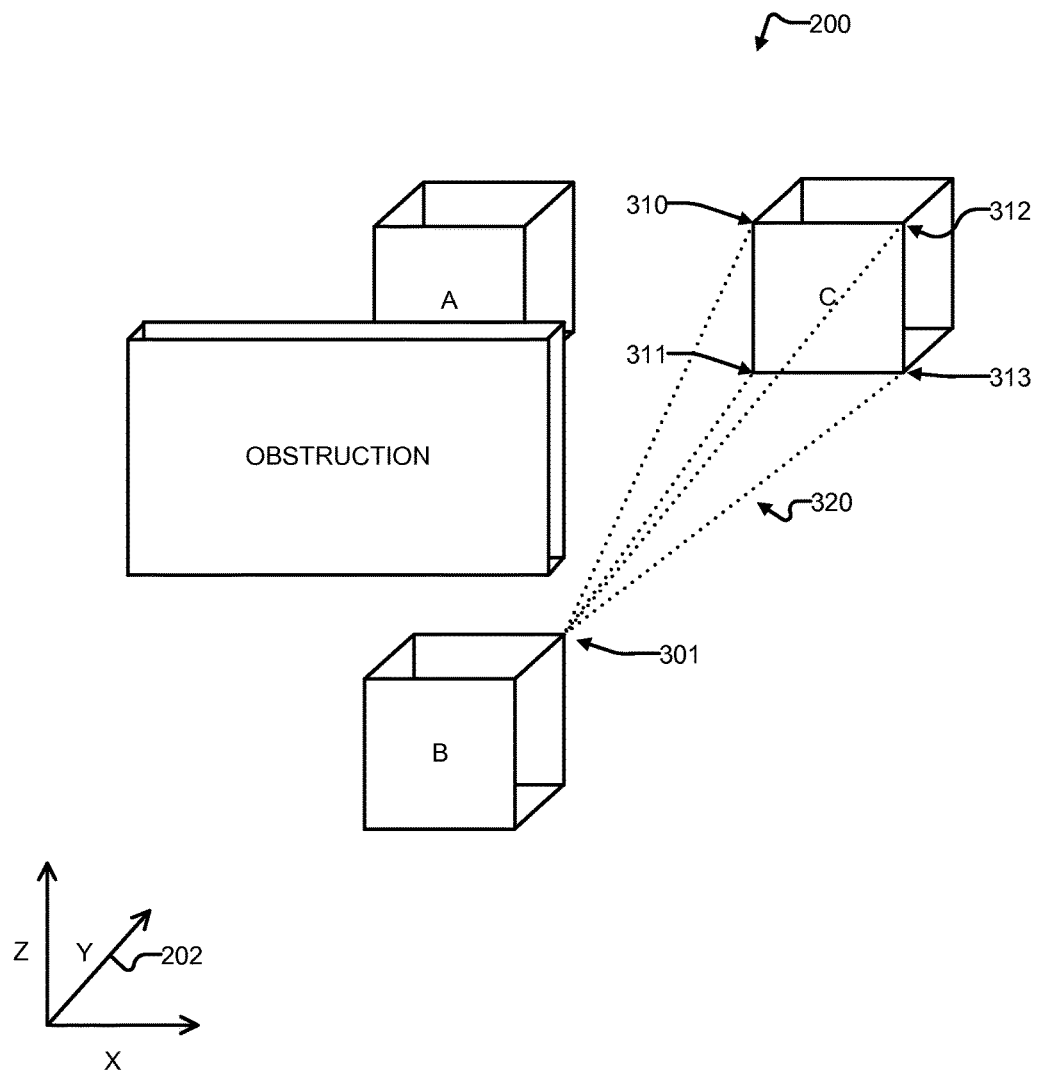
FIG. 3A is a diagram illustrating aspects of a virtual space for processing by a vision-obstruction service in one configuration described herein.
Figure 3B:
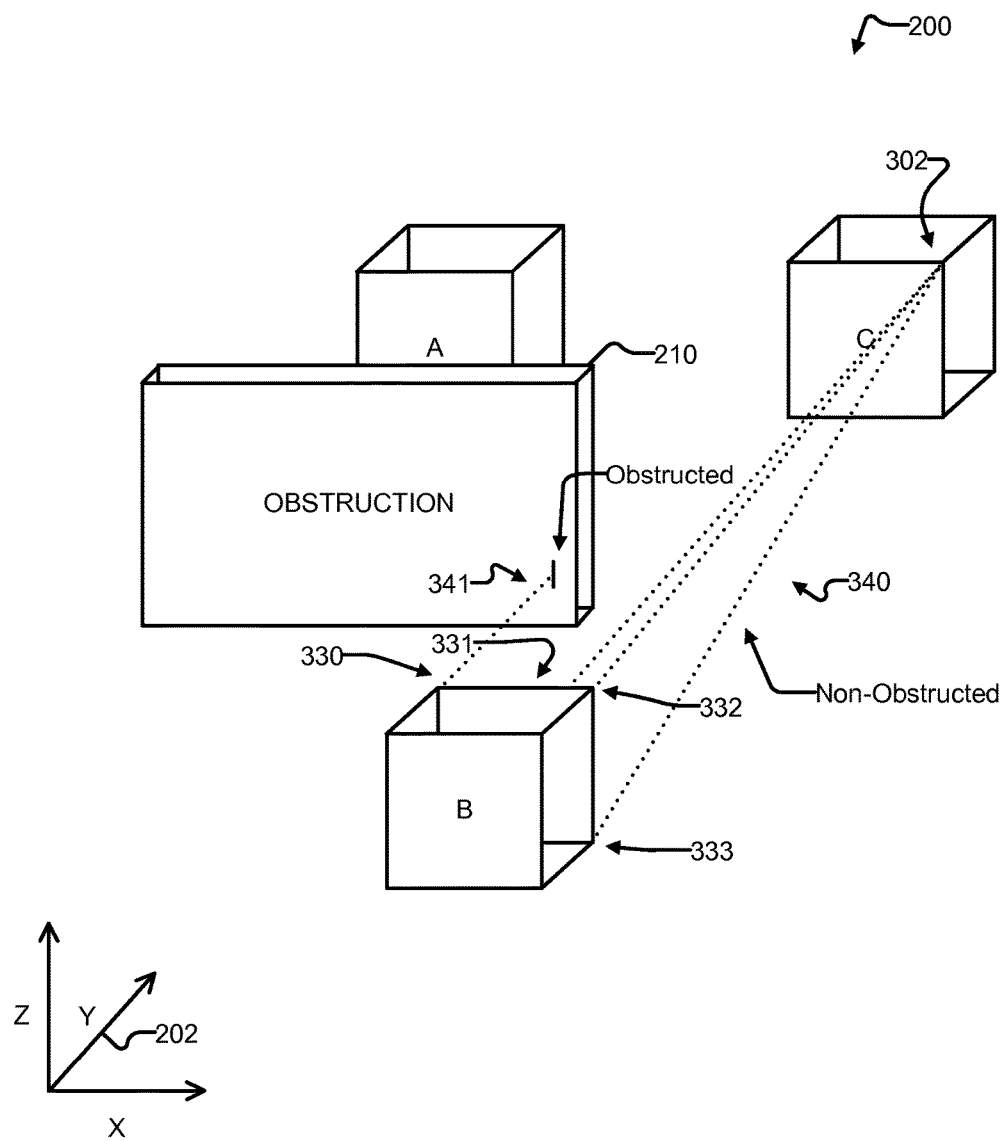
FIG. 3B is a diagram illustrating aspects of a virtual space for processing by a vision-obstruction service in one configuration described herein.
Figure 3C:
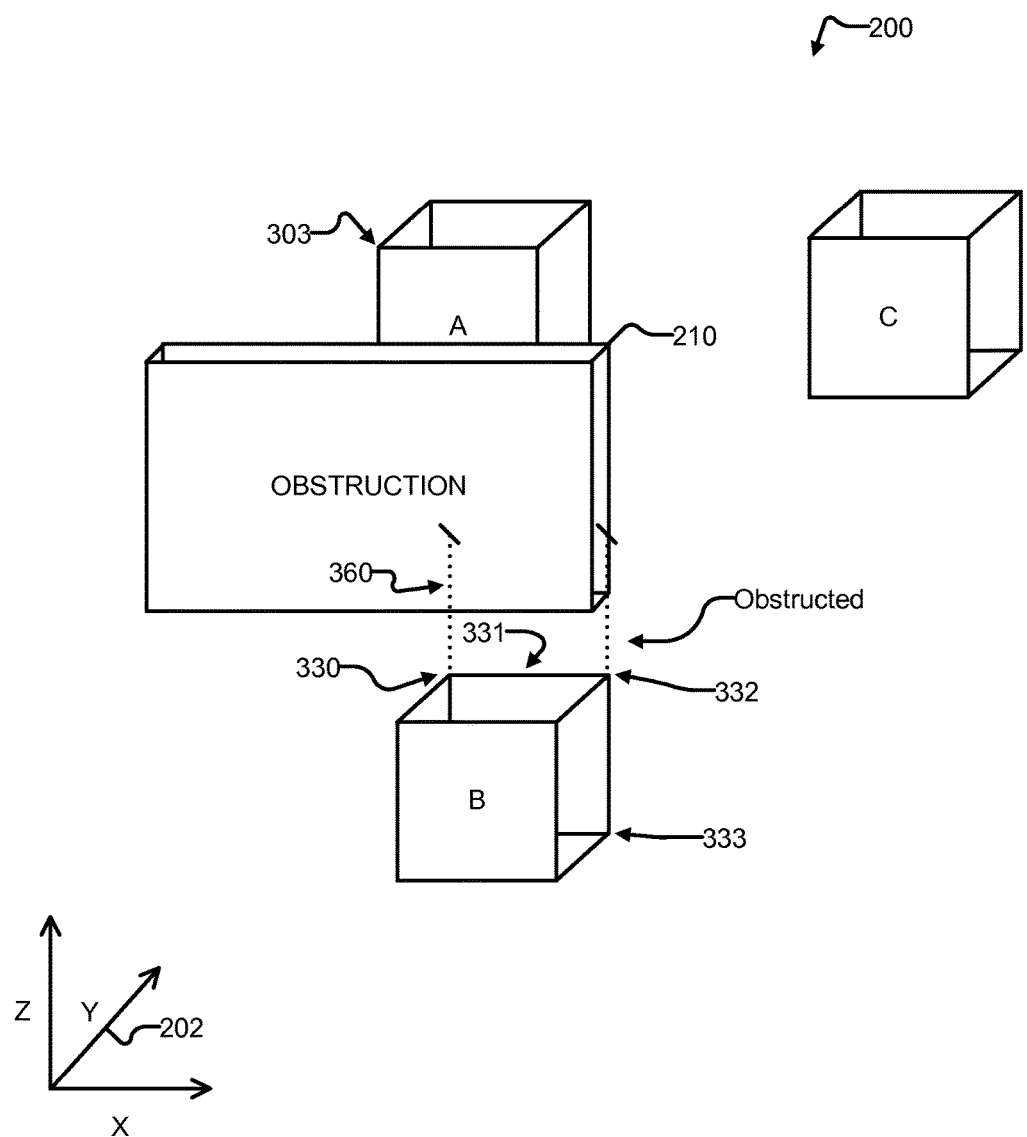
FIG. 3C is a diagram illustrating aspects of a virtual space for processing by a vision-obstruction service in one configuration described herein.

Turning now to FIGS. 3A, 3B, and 3C, three-dimensional renderings of the virtual space 200 are provided with coordinate axes 202 for spatial reference. FIG. 3A generally illustrates boundary data 108 useful in determining the visibility of element C from a point of observation 301 on element B. As further shown, boundary data 108 including edges 310, 311, 312, and 312 of element C can also be generated.

Generally, the vision-obstruction service 120 can process boundary data 108 representing the point of observation 301 and edges 310, 311, 312, and 312 to generate raytraces or vector data 320. It is noted that although illustrated as raytraces extending from particular points on element C, the same can be varied in many ways. Additional raytraces from straight or curved edges are also possible. Furthermore, more complex edges and raytraces for differing shapes are also possible.

Upon creation of the vector data 320, the vision-obstruction service 120 can initialize a processing unit instance 122 to process and generate vision data 129. According to at least one configuration, the processing unit instance 122 is configured to generate vision data 129 indicative of positive visibility if all raytraces of the vector data 121 result in visibility from the point of observation 301. According to another configuration, the processing unit instance 122 is configured to generate vision data 129 indicative of positive visibility if a threshold number of raytraces of the vector data 121 result in visibility from the point of observation 301. The threshold value may be a percentage of all raytraces, in one example. In the example of virtual space 200 illustrated in FIG. 3A, it is readily apparent that element C is visible from observation point 301. It is noted that initialization of processing unit instances 122 may be based on the point of observation 301, groups of raytraces of vector data 320, and/or individual raytraces of vector data 320. Accordingly, individual processing unit instances 122 may be initialized for any portion of a visibility calculation, including sub-portions of the vector data 320 or for each associated point of observation 301.

FIG. 3B generally illustrates boundary data 108 useful in determining the visibility of element B from a point of observation 302 on element C. As further shown, boundary data 108 including edges 330, 331, 332, 333 of element B can also be generated.

Generally, the vision-obstruction service 120 can process boundary data 108 representing the point of observation 302 and edges 330, 331, 332, 333 to generate raytraces or vector data 340. It is noted that although illustrated as raytraces extending from particular points on element B, the same can be varied in many ways as described above.

Upon creation of the vector data 340, the vision-obstruction service 120 can initialize one or more processing unit instances 122 to process and generate vision data 129. As shown in FIG. 3B, visibility of element B from the point of observation 302 is partially obstructed. For example, a single raytrace 341 of the vector data 340 is obstructed by the obstruction 310. However, as described above, if a threshold number of the vector data 340 result in positive visibility, the one or more processing unit instances 122 may return vision data 129 indicating visibility. For example, if the threshold value is chosen to be 76%, element B may not be visible from the point of observation 302. However, if the threshold value is chosen to be 74%, element B may be visible from the point of observation 302. Furthermore, additional visibility determinations can be made if additional points of observation are considered.

FIG. 3C generally illustrates boundary data 108 useful in determining the visibility of element B from a point of observation 303 on element A. As further shown, boundary data 108 including edges 330, 331, 332, 333 of element B can also be generated. Generally, the vision-obstruction service 120 can process boundary data 108 representing the point of observation 303 and edges 330, 331, 332, 333 to generate raytraces or vector data 360.

Upon creation of the vector data 360, the vision-obstruction service 120 can initialize one or more processing unit instances 122 to process and generate vision data 129. As shown in FIG. 3C, visibility of element B from the point of observation 303 is completely obstructed. Accordingly, in the example illustrated in FIG. 3C, it may be determined that element B is not visible from the point of observation 303.

As described above, many visibility calculations can be performed through processing of the virtual space 200 by the vision-obstruction service 120. Although the diagrams illustrated in FIGS. 2 and 3 have been greatly simplified, it should be readily understood that more complex calculations based on many different geometric shapes and elements are within the scope of this disclosure.

Figure 4:
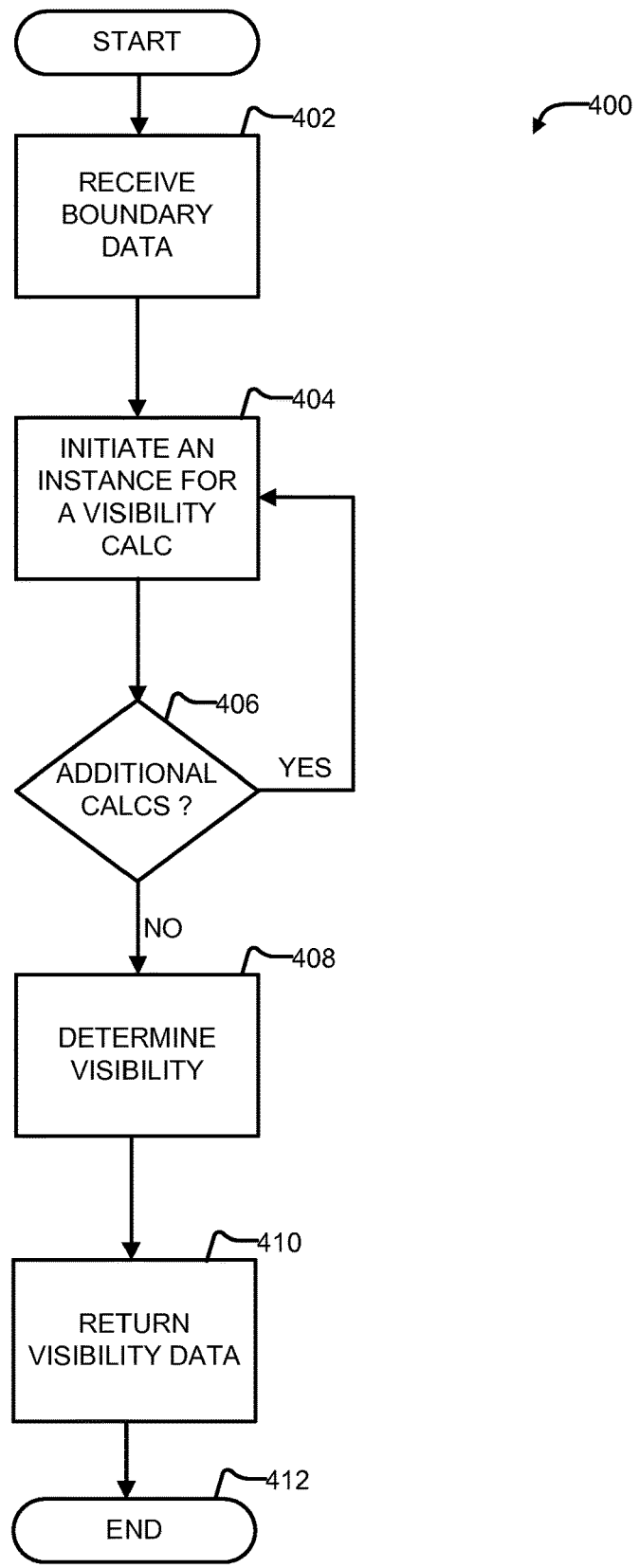
FIG. 4 is a flow diagram illustrating aspects of the operation of a vision-obstruction service in one configuration disclosed herein.

As described above, the vision-obstruction service 120 may determine visibility data 130 efficiently through distributed computing of processing unit instances 122. Hereinafter, the operation of the system 100 and components described therein is presented with reference to FIG. 4. FIG. 4 is a flow diagram of a method 400 illustrating aspects of the operation of the vision-obstruction service 120 in one configuration disclosed herein.

As shown in FIG. 4, the vision-obstruction service 120 receives boundary data 108 at block 402. Thereafter, the vision-obstruction service may determine one or more visibility calculations necessary given the boundary data 108. For example, as illustrated in FIGS. 3A-3C, if multiple points of observation 301, 302, and 303 are described in the boundary data 108, at least three visibility calculations are necessary. Furthermore, as described above, additional or more complex points of observation are also applicable for any given element in the virtual space 200. As also described above, additional visibility calculations based upon sub-portions of the raytrace/vector data 320, 340, 360 are also applicable in some implementations. Thus, more or fewer visibility calculations are also possible.

The vision-obstruction service 120 is further configured to initiate an instance of a processing unit 122 at the service provider network 112 for each visibility calculation, at block 404. The vision-obstruction service 120 may determine if additional visibility calculations are necessary at block 406, and continue to initiate processing unit instances 122 for each visibility calculation.

As each processing unit instance 122, and associated vector task 124, returns vision data 129, the vision-obstruction service 120 may assemble the vision data 129 to determine a result for the visibility calculations at block 408. For example, the vector tasks 124 may process raytracing algorithms configured to generate vision data 129. The raytracing algorithms may include any suitable algorithms, including algorithms configured to determine if a virtual representation of a ray of light can travel, uninterrupted, between two points in a virtual space. One possible algorithm is a k-d tree traversal algorithm. The k-d tree traversal generally includes traversing a binary tree of axis-aligned-splitting-planes, or triangles, with one or more rays or vectors. The k-d tree traversal algorithm returns a first triangle that the rays intersect. Further traversal returns other intersections.

Other raytracing algorithms may also be suitable. Furthermore, variants of the k-d tree traversal algorithm may also be applicable. For example, a kd-restart or kd-backtrack variation of the k-d tree traversal algorithm can be used. The kd-backtrack variant includes well-defined asymptotic bounds but may include a relatively large amount of data for each node of the k-d tree. The kd-restart variant may be less complex than the kd-backtrack variant for some forms of spatially partitioned virtual spaces. It is noted that all variations of k-d tree traversal, and potentially other forms of raytracing algorithms, can be used to determine visibility. Accordingly, the scope of this disclosure includes all potential raytracing algorithms for distributed processing across processing unit instances 122.

After determining visibility as described above, the vision-obstruction service 120 may return the visibility data 130 indicative of the visibility calculations of the boundary data 108, at block 410, and the method 400 may cease at block 412.

Figure 5:
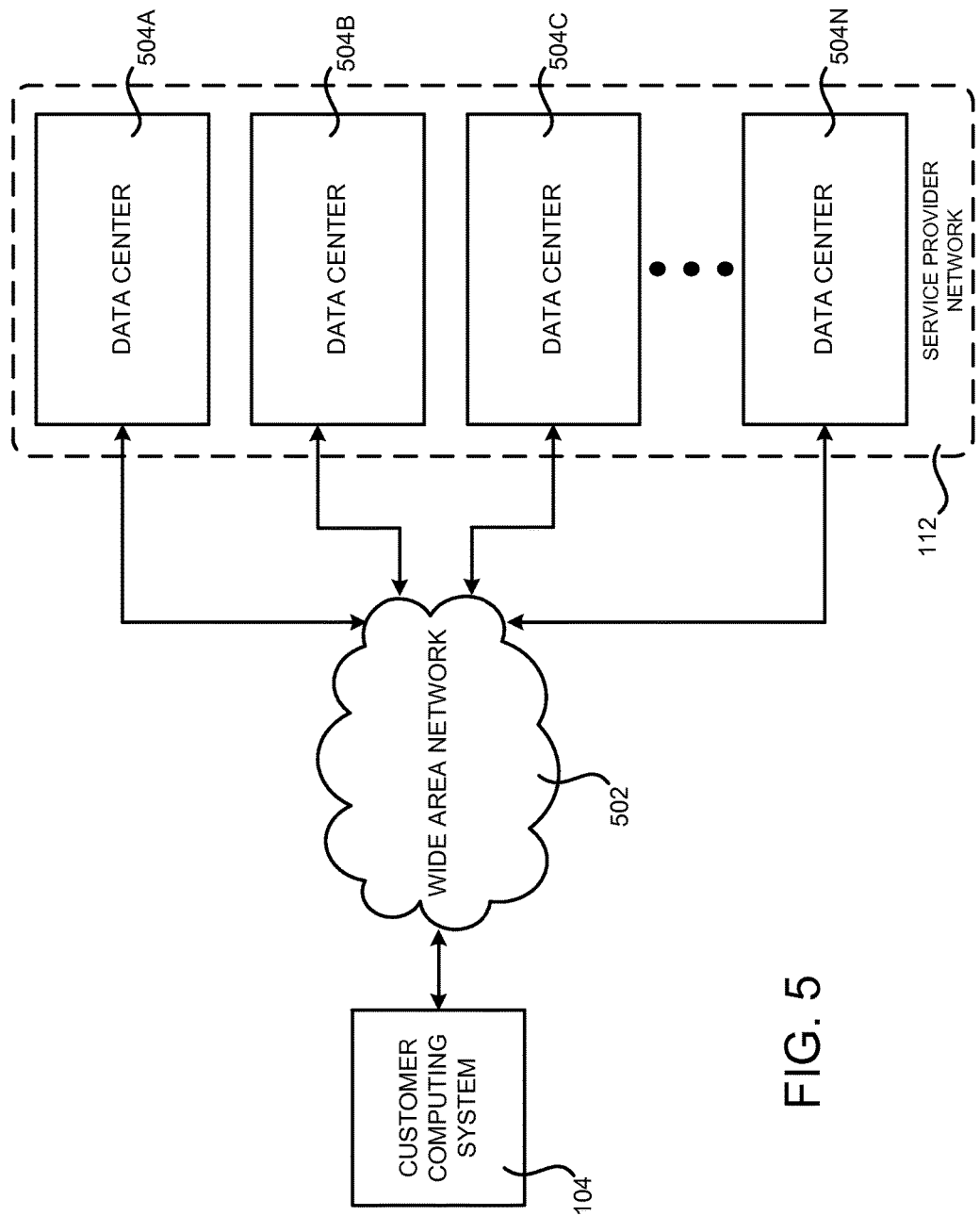
FIG. 5 is a system and network diagram that shows an illustrative operating environment for the various technologies disclosed herein that includes a service provider network that may be configured to implement aspects of the functionality described herein.

FIG. 5 is a system and network diagram that shows one illustrative operating environment for the configurations disclosed herein that includes a service provider network 112 that may be configured to provide a vision-obstruction service 120 in the manner described above, according to one configuration disclosed herein. As discussed briefly above, the service provider network 112 can provide computing resources, including processing unit instances 122 such as, for example, GPU instances. The processing unit instances 122 may be instantiated through the vision-obstruction service 120, on a permanent or an as-needed basis.

The computing resources provided by the service provider network 112 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 112 might also be configured to provide various network services including the application service 110.

The computing resources provided by the service provider network 112 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating a vision-obstruction service 120 within the service provider network 112 will be described below with regard to FIG. 6.

The customers and other users of the service provider network 112 may access the computing resources provided by the service provider network 112 over a network 502, such as a wide area network (WAN). For example, and without limitation, a customer computing system 104 might be utilized to access the service provider network 112 by way of the network 502. It should be appreciated that a local-area network (LAN), the Internet, or any other networking topology known in the art that connects the data centers 504 to remote customers and other users may be utilized. It should also be appreciated that combinations of such networks might also be utilized.

Figure 6:
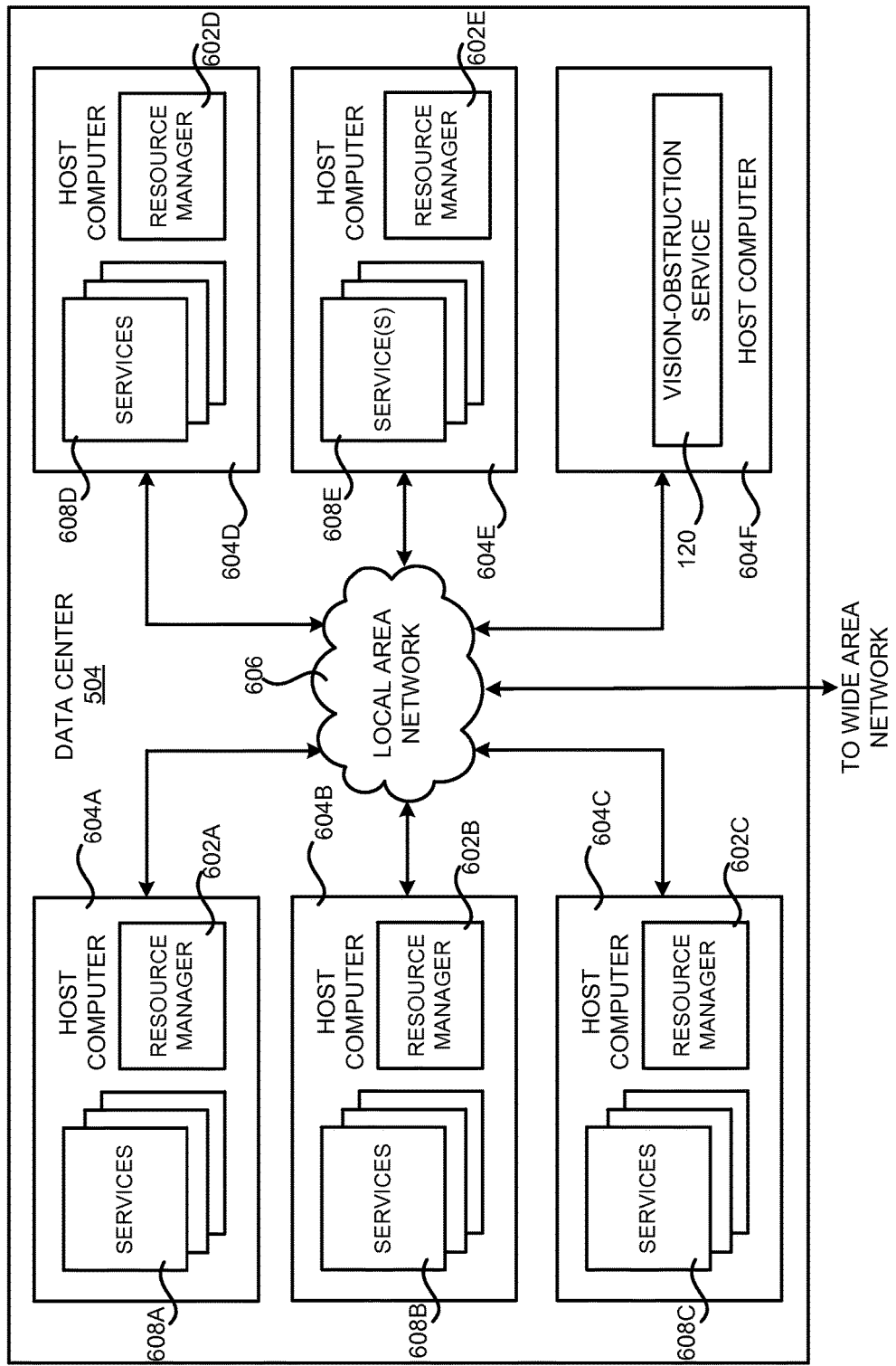
FIG. 6 is a computing system diagram that illustrates a configuration for a data center that may be utilized to implement aspects of the concepts and technologies disclosed herein.

FIG. 6 is a computing system diagram that illustrates one configuration for a data center 504 that implements aspects of the concepts and technologies disclosed herein for implementing a vision-obstruction service 120, vision-based service 114, and other services, according to one configuration disclosed herein. The example data center 504 shown in FIG. 6 includes several server computers 602A-602F (which may be referred to herein singularly as "a server computer 602" or in the plural as "the server computers 602") for providing computing resources 608A-608E.

The server computers 602 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources based on vector data 121 provided for processing by the vision-obstruction service 120. In the case of virtual machine instances, for example, the resource manager 604 might be a hypervisor or another type of program configured to enable the execution of multiple virtual machine instances on a single server 602 to implement the vector tasks 124 and/or processing unit instances 122, for example. Server computers 602 in the data center 504 might also be configured to provide network services and other types of services, as well.

The data center 504 shown in FIG. 6 also includes a server computer 602F that may be utilized for executing some or all of the software components described above. For example, and without limitation, the server computer 602F might be configured to execute the vision-obstruction service 120, which has been described in detail above. The server computer 602F might also be configured to execute other components and/or store data for providing some or all of the functionality described herein.

In the example data center 504 shown in FIG. 6, an appropriate LAN 606 is utilized to interconnect the server computers 602A-602F. The LAN 606 is also connected to the network 502 illustrated in FIG. 5. It should be appreciated that the configuration and network topology illustrated in FIGS. 1 and 5-6 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with respect to FIG. 6 is merely illustrative and that other implementations might be utilized.

Figure 7:
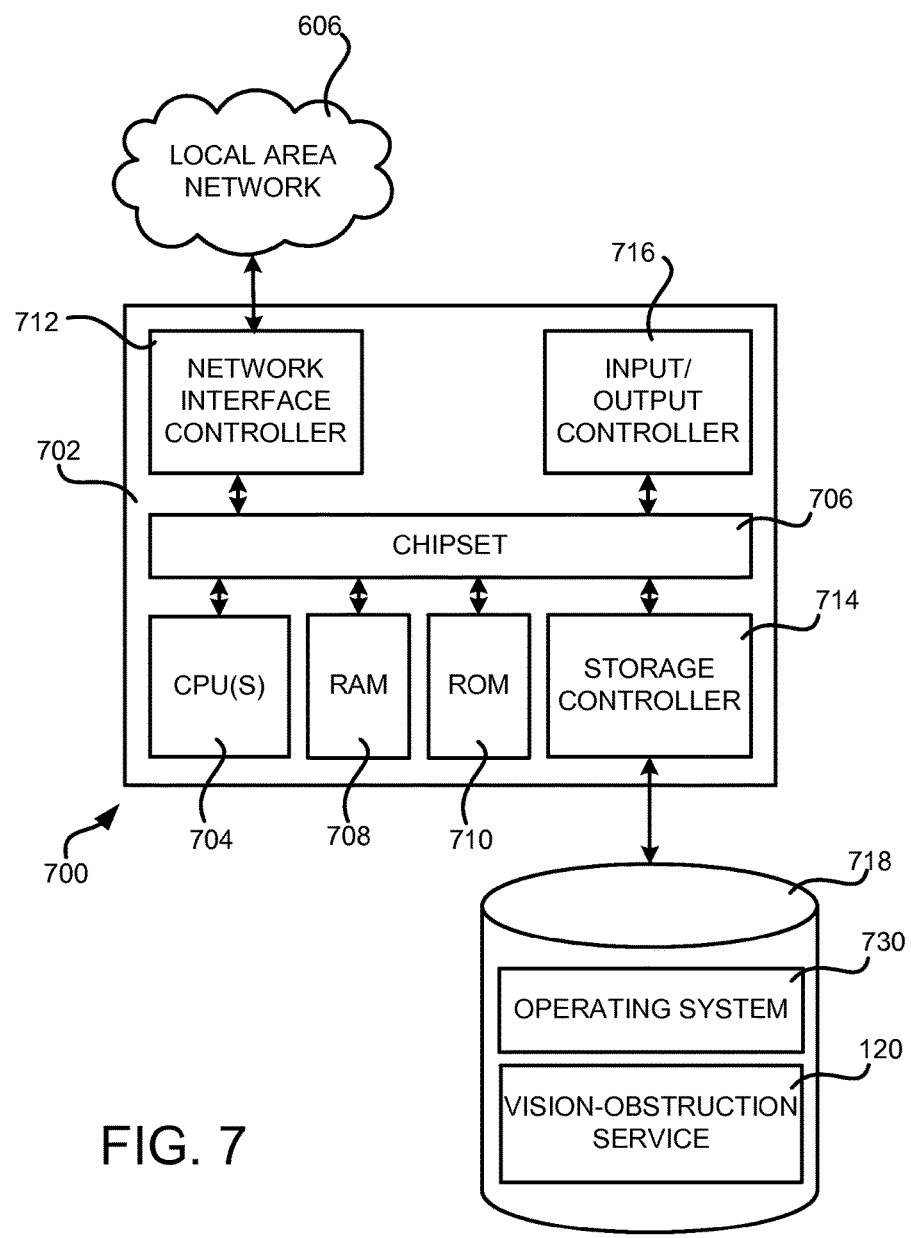
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing program components for implementing the vision-obstruction service 120 in the manner described above. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, the computer architecture shown in FIG. 7 may be utilized to execute software components for providing the vision-obstruction service 120 and/or related functionality. The computer architecture shown in FIG. 7 might also be utilized to implement a customer computing system 104 or any other of the computing systems described herein.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 804 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the local area network 706. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 718 may store other system or application programs and data utilized by the computer 700, such as the vision-obstruction service 120, and/or any of the other software components and data described above. The mass storage device 718 might also store other programs and data not specifically identified herein.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various routines described above with regard to FIGS. 3-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for providing a vision-obstruction service, and for distributed processing to determine visibility in a virtual space, have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method of determining visibility in a virtual environment, the method comprising:
   receiving, from a client computing device, boundary data that identifies bound information that encompasses an individual object of one or more objects rendered by an application executing on the client computing device, the boundary data including a point of observation and wherein the boundary data includes one or more of obstructed points or non-obstructed points;
   generating, via one or more computing devices associated with a service provider network, visibility data, wherein the generating includes
      initiating graphical processing unit (GPU) instances to process information associated with the boundary data, and
      generating, by the GPU instances, visibility data based at least in part on the boundary data, the visibility data indicating whether at least one of the one or more objects is visible by the point of observation; and transmitting at least a portion of the visibility data to the client computing device.

2. The computer-implemented method of claim 1, wherein the GPU instances comprise:
   a first GPU instance to process information associated with a first set of edges of a first boundary of the individual object; and
   a second GPU instance to process information associated with a second set of edges of a second boundary of the individual object, wherein the first GPU instance and the second GPU instance are configured to process vector data substantially contemporaneously.

3. The computer-implemented method of claim 2, further comprising:
   outputting, by the first GPU instance, first vision data representing visibility of the first boundary;
   outputting, by the second GPU instance, second vision data representing visibility of the second boundary; and
   processing the first vision data and the second vision data to determine the visibility data.

4. The computer-implemented method of claim 3, wherein the visibility data indicates positive visibility of the first boundary or the second boundary from the point of observation.

5. The computer-implemented method of claim 4, wherein the boundary data further describes a plurality of boundaries and a plurality of points of observation, the method further comprising initiating additional GPU instances to process raytrace algorithms for the plurality of boundaries and the plurality of points of observation.

6. A computing system to determine visibility in a virtual environment rendered by a graphical application, the computing system comprising:
   one or more computing devices of a service provider network configured to:
      receive, from a client computing device, boundary data that identifies bound information that encompasses an individual object of one or more objects rendered by an application configured to execute on the client computing device, wherein the boundary data includes a plurality of three-dimensional (3D) elements associated therewith and positioned within the virtual environment;
      initiate a plurality of GPU instances on the one or more computing devices to process information associated with the 3D elements;
      generate visibility data based at least in part on the boundary data, the visibility data indicating whether at least one of the one or more 3D elements is visible by a point of observation within the virtual environment; and
      transmit at least a portion of the visibility data to the client computing device.

7. The computing system of claim 6, wherein the virtual environment is spatially partitioned.

8. The computing system of claim 6, wherein the boundary data describes at least the point of observation.

9. The computing system of claim 8, wherein the one or more computing devices are further configured to:
   process, by the GPU instances, raytrace algorithms to determine whether unobstructed raytraces exist between the at least one point of observation and individual 3D elements of the plurality of 3D elements.

10. The computing network of claim 6, wherein the GPU instances are configured to process raytrace algorithms substantially contemporaneously.

11. The computing system of claim 10, wherein generating the visibility data comprises:
    determining that a number of unobstructed raytraces exceeds a threshold value; and
    determining that visibility is positive at the at least one point of observation.

12. The computing system of claim 10, wherein generating the visibility data comprises:
    determining that a number of unobstructed raytraces does not exceed a threshold value; and
    determining that visibility is negative at the at least one point of observation.

13. The computing system of claim 6, wherein the client computing device is configured to execute the graphical application and render the virtual environment.

14. The computing system of claim 13, wherein the graphical application executing at the client computing system is configured to generate the boundary data based at least in part on the virtual environment.

15. The computing system of claim 6, further comprising a data store in communication with the one or more computing devices and a plurality of vision-based services executing on the one or more computing devices.

16. The computing system of claim 6, wherein the plurality of GPU instances comprise at least one vector task executing thereon and configured to process an associated raytrace algorithm.

17. A non-transitory computer-readable storage medium having computer-executable instructions stored thereupon which, when executed by a computer, cause the computer to:
    receive, from a client computing device, boundary data that identifies bound information that encompasses an individual object of one or more objects rendered by an application configured to execute on the client computing device, wherein the boundary data includes at least a boundary of the individual object and a point of observation;
    initiate processing unit instances on one or more computing devices of a service provider network to process information associated with the boundary data;
    generate, by the processing unit instances, visibility data based at least in part on the boundary data, the visibility data indicating whether at least one of the one or more objects is visible by the point of observation; and
    transmit at least a portion of the visibility data to the client computing device.

18. The non-transitory computer-readable storage medium of claim 17, having further computer-executable instructions stored thereupon to:
    determine that a number of unobstructed raytraces exceeds a threshold value; and
    responsive to determining that the number of unobstructed raytraces exceeds the threshold value, determining that visibility is positive at the point of observation.

19. The non-transitory computer-readable storage medium of claim 17, having further computer-executable instructions stored thereupon to:
    determine that a number of unobstructed raytraces does not exceed a threshold value; and
    determining that visibility is negative at the point of observation.

20. The non-transitory computer-readable storage medium of claim 17, wherein the boundary data further describes a plurality of boundaries and a plurality of points of observation, the non-transitory computer-readable storage medium having further computer-executable instructions stored thereupon to initiate a plurality of additional processing unit instances to process raytrace algorithms for the plurality of boundaries and the plurality of points of observation.

* * * * *